Dec. 17, 1968   R. A. PRESTON   3,416,397
SHEARING APPARATUS FOR KEYS
Filed Dec. 19, 1966
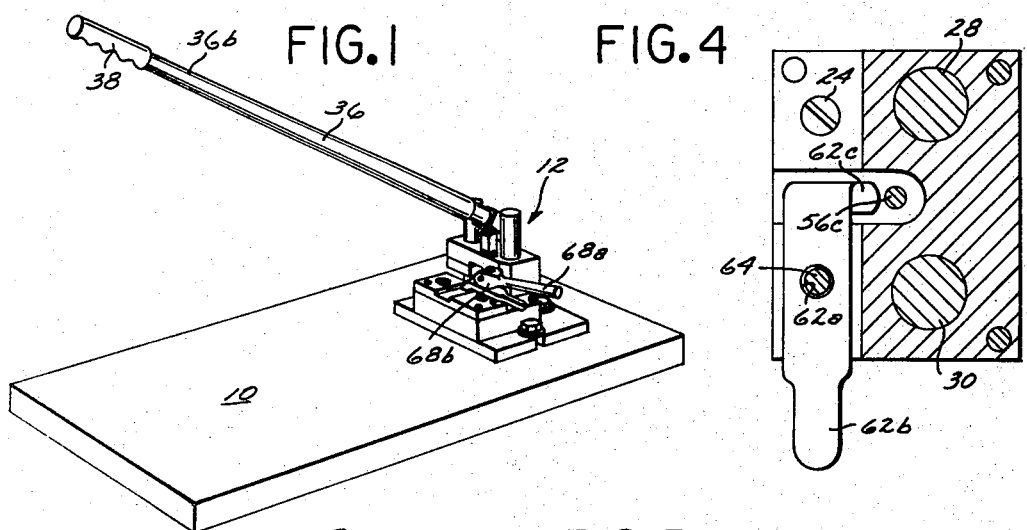
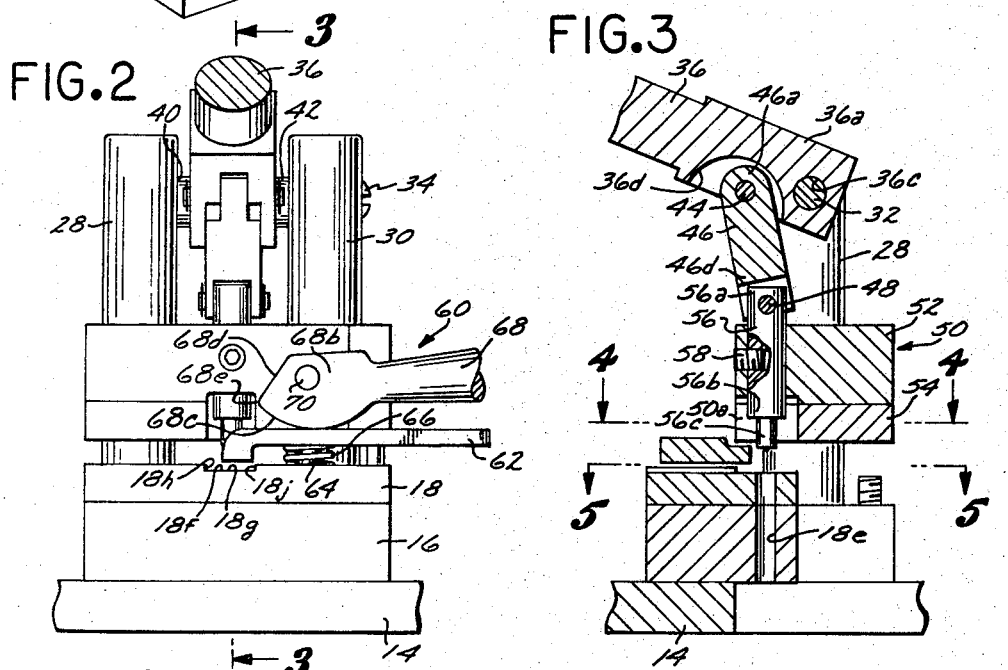
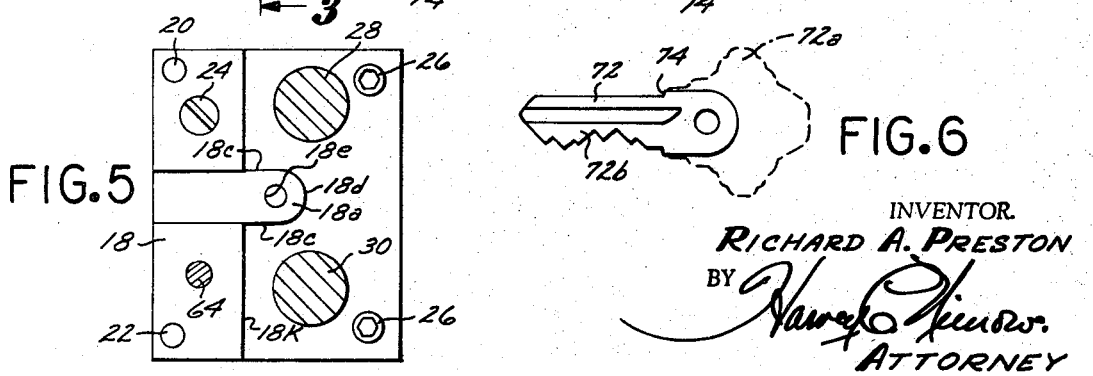
INVENTOR.
RICHARD A. PRESTON
BY
ATTORNEY

United States Patent Office 3,416,397
Patented Dec. 17, 1968

3,416,397
SHEARING APPARATUS FOR KEYS
Richard A. Preston, 520 W. 17th St.,
Santa Ana, Calif. 92706
Filed Dec. 19, 1966, Ser. No. 602,869
9 Claims. (Cl. 83—459)

ABSTRACT OF THE DISCLOSURE

Apparatus for retaining an ordinary key, for use in a lock, in a predetermined position relative to cutting and punching dies whereby the head of the key can be sheared from the shank thereof and an aperture punched in one end of the shank of such key.

Shearing apparatus as above described which can be operated quickly and effectively to uniformly shear the head from each key of a series of keys and to punch a hole therein to enable the keys to be carried on a single retaining element or screw.

---

The present invention relates generally to shearing apparatus for keys and more particularly to such apparatus for uniformly removing the heads of each key in a series of keys.

Today, virtually every person carries a group of keys for protecting ones possessions in a safe location. Keys are employed for locking and unlocking homes, offices, garages, safes, cars and many other private receptacles.

The man or woman carrying such a group of keys is burdened by the weight thereof, and also must have relatively large pockets or purses wherein to store them. Such pockets or purses frequently are worn out within a short period of time merely by the constant rubbing and weight of such keys.

To eliminate such conditions, it has been proposed to remove the heads of all of the keys and to provide an opening in the shanks thereof for receiving a single fastening screw. However, keys are normally made of relatively strong hard metal such as steel, brass or the like to insure that they will retain their particular configuration for operating the respective locks for which they have been made. Thus, in order to shear the heads from the shanks of such keys, relatively strong metal cutting devices such as saws and the like must be utilized.

It has been realized for some period of time that it would be advantageous to have a shearing device which would virtually automatically shear the heads from the key shanks. To this end it is an object of the present invention to provide shearing apparatus for keys which can be manually operated or which can be operated by any suitable source of power.

Another object of the present invention is to provide shearing apparatus as characterized above which includes means for properly locating the key relative to cutting means employed in the apparatus.

Another object of the present invention is to provide shearing means as characterized above including relatively movable cutting dies which cut the heads from the key shank in a predetermined configuration.

A still further object of the present invention is to provide shearing apparatus for keys as characterized above which further comprises punching means for automatically and simultaneously punching a hole in one end of the key shank.

Another object of the present invention is to provide shearing apparatus for keys as characterized above having unique and quick acting retaining means for firmly retaining a key in its proper position relative to the cutting dies during the shearing operation, such retaining means being releasable thereafter for removal of the key shank.

A still further object of the present invention is to provide shearing apparatus for keys as characterized above which is simple and inexpensive to manufacture and which is rugged and dependable in operation.

The novel features which I consider characteristic of my invention are set forth with particularly in the appended claims. The invention itself, however, both as to its organization and mode of operation, together with additional objects and advantages thereof, will be best understood from the following description of specific embodiments when read in connection with the accompanying drawings, in which:

FIGURE 1 is a perspective view of one embodiment of the present invention;

FIGURE 2 is a fragmentary front sectional view of the apparatus of FIGURE 1;

FIGURE 3 is a sectional view, taken substantially along line 3—3 of FIGURE 2;

FIGURE 4 is a sectional view, taken substantially along line 4—4 of FIGURE 3;

FIGURE 5 is a sectional view, taken substantially along line 5—5 of FIGURE 3; and FIGURE 6 is a side view of a key, the head of which has been removed.

Like reference characters indicate corresponding parts throughout the several views of the drawings.

Referring to the drawings, there is shown therein one embodiment 12 of the present invention. As will be readily understood by those persons skilled in the art, such embodiment may be modified or altered in certain respects without departing appreciably from the essence of the present invention.

A platform or mounting board 10 is provided whereon the various parts of the apparatus can be suitably secured and assembled.

Embodiment 12, as best shown in FIGURES 2 and 3 of the drawings, comprises a base plate 14 to which is secured a body member 16 by means to be hereinafter described. A stationary die 18 is mounted on body member 16 as shown. In order to properly align the base plate 14, body member 16 and stationary die 18, suitable locating pins 20 and 22 are provided in the base plate 14. Such pins cooperate with suitable through-openings formed in body member 16 and stationary die 18 whereby such members are properly aligned. A fastening bolt 24 extends through suitable through-openings in body member 16 and stationary die 18 and threadedly engages a threaded opening in base plate 14.

As shown most clearly in FIGURE 5 of the drawings, stationary die 18 is provided with an unique configuration, in order to properly shear the key. Such die comprises a rearward extension 18a having an exterior configuration 18b which conforms to the desired outline or shape of the shank of the key, as will hereinafter become more apparent. Such configuration has relatively straight side portions 18c and arcuate end portion 18d.

Die 18 is further formed with a through-opening 18e for receving a punch to be hereinafter described. The central portion 18f of die 18 is recessed, affording a flat supporting surface 18g and side walls 18h and 18j. The flat supporting surface 18g, of course, extends onto the rearward extension 18a of die 18.

Die 18 is utilized for cooperation with a movable die to shear the head of a key from the shank thereof. In view of this, such die should be formed of relatively hard tool steel so that the shearing or cutting edges will not quickly deteriorate.

Body member 16 is anchored to base plate 14 by suitable set screws 26 as shown most clearly in FIGURE 5 of the drawings.

Firmly anchored in body member 16 and base plate 14 are two cylindrically shaped supports 28 and 30. A cross bar 32 extends between the supports 28 and 30 near the upper ends thereof. Such cross bar may take substantially any desired form but is shown in drawings as comprising a bolt which extends through a suitable opening in support 30 and which is threadedly engaged in an aligned opening in support 28. The bolt is provided with a head 34 for ease in assembly, as will be readily apparent.

For operating the device, an actuating lever 36 is provided having an enlarged square end portion 36a. The opposite end portion 36b of lever 36 is provided with a hand grip 38 for manual operation of the apparatus as will hereinafter appear.

End portion 36a of lever 36 is formed with a through-opening 36c for receiving the cross bar 32 as shown most clearly in FIGURE 3. To centrally locate the actuating lever 36 in the apparatus, suitable spacers 40 and 42 are provided on opposite sides of end portion 36a.

Said end portion is further formed with an arcuate cutout 36d, and a fastening pin 44 is positioned to extend thereacross as shown. A link 46 has an upper end portion 46a formed with an opening for receiving the pin 44 within the cutout 36d. The lower end portion 46b of line 46 is bifurcated and formed with aligned openings for receiving a pivot pin 48.

Mounted on supports 28 and 30 for vertical rectilinear movement is a movable die 50 which may be formed in two parts. An upper die member 52 is firmly secured to a lower die member 54 by appropriate means. Each such die member is formed with a pair of openings for receiving the supports 28 and 30. Due to this arrangement, the movable die 50 can be moved up and down on such support members relative to the stationary die 18.

Die 50 is formed with a cutout 50a which is shaped complementally of the exterior surface or cutting edge of the rearward extension 18a of stationary die 18. Thus, such movable die 50 cooperates with both the straight side edges 18c as well as with the arcuate edge 18d of the stationary die to effect the desired shearing action. It should be noted that the lower die member 54 of die 50 should be formed of relatively hard tool steel to withstand the wear at the cutting edge.

Mounted within a vertical through-opening formed in die 50 is a punch element 56. Such element 56 is held in fixed position therein by a set screw 58 which extends through aligned openings in die member 52 and punch element 56. The upper end 56a of punch element 56 fits within the bifurcated lower end portion of link 46 and is formed with an opening for receiving the pivot pin 48.

The lower end 56b of element 56 is formed with a reduced end portion 56c which cooperates with opening 18e in stationary die 18 to punch a hole in the shank of the key as will hereinafter become apparent.

Mounted on stationary die 18 of the subject apparatus 12 is retaining means 60. A retaining element 62 is mounted on a stationary pin 64, which is secured within base member 16 and base plate 14. Such pin extends upwardly through a suitable opening 62a in retaining element 62. Said element is provided at one end with manual adjustment means 62b, while the opposite end is formed with an extension 62c having a flat under surface for engagement with a key as will hereinafter be explained.

A compression spring 66 is interposed between the upper surface of stationary die 18 and the undersurface of element 62.

A locking member 68 is provided on retaining element 62 and is provided with a handle 68a and a bifurcated end portion 68b as best shown in FIGURE 1 of the drawings. The arms of such bifurcated end portion receive a pivot pin 70 which also extends through a transverse opening in the upper end of stationary pin 64. The arms of the bifurcated end portion are thus positioned on opposite sides of pin 64, and are individually formed with an arcuate undersurface 68c and a relatively straight forward surface 68d. The arcuate surface 68c operates as a cam surface upon rotation of locking member 68 on pin 70.

FIGURE 6 shows a key 72 having a head 72a, shown in dotted lines, and a shank 72b. In order to properly shear the head 72a from the shank 72b the following procedure should be employed.

With the lever 36 in its uppermost position, the upper die 50 is retracted from the stationary die 18. The key 72 is then placed within the depression 18f of stationary die 18. Every ordinary key, as shown with respect to key 72 of FIGURE 6, is formed with a travel limiting shoulder 74. Such shoulder may be at some predetermined location along the top or lower edge of the key or, in some cases, two such shoulders may be provided.

The travel limiting shoulder 74 should be located at one of the corners of die 18 as afforded by either of side walls 18h and 18j and the surface 18k. In this regard, the key 72 should be pressed against the appropriate side wall of such recess 18g with the corner 74 firmly against the corner of die 18 thereat.

The retaining element 62 is then firmly clamped down on the key in such position, by rotating locking element 68 in a counterclockwise direction as shown in FIGURE 2 of the drawings. Such movement of locking element 68 cams the element 62 downwardly to cause the extension 62c to firmly engage the key. Such camming action, of course, is the result of the arcuate surface 68c of the arms of the bifurcated end portion 68b on element 62.

The relatively flat surface 68d of locking element 68 provides a point 68e which acts as a means for holding the retaining element 62 in its position of engagement with key 72 against the force of compression spring 66.

The lever 36 is then pulled down causing the movable die 50 to slidingly engage the stationary die 18 in shearing the head 72a from the shank 72b in accordance with the showing in FIGURE 6. Also, such downward movement of die 50 causes punch 56 to engage the end of shank 72b to provide a through hole therein. It should be noted that the end portion 56c of punch 56 engages the key prior to engagement thereof by die 50. This causes the punching operation to be commenced before the shearing operation, the punch 56 thereafter acting to further retain the key in proper position.

To remove the key, the locking element 68 is rotated in a clockwise direction so as to permit compression spring 66 to move retaining element 62 upwardly. The key 72 is then removed from the recess 18f of die 18.

It should be particularly noted that by positioning the shank of key 72 against one of the side walls 18h and 18j of recess 18f, such key is properly aligned in opposite side-wise directions relative to the cutting dies. Further, by placing the travel limiting shoulder 74 against the corner of the stationary die 18, as above explained, the key is thereby properly oriented in forward-rearward opposite directions. This enables an entire series or group of keys to be sheared with the subject apparatus, all of such keys having their shank end portions shaped in the same manner. A fastening screw or bolt can then be utilized in the through openings of the various keys.

It is thus seen that the present invention provides shearing apparatus for keys for shearing and punching the keys uniformly and in a quick and easy manner.

Although I have shown and described certain specific embodiments of my invention, I am fully aware that many modifications thereof are possible. My invention, therefore, is not to be restricted except insofar as is necessitated by the prior art and by the spirit of the appended claims.

I claim:

1. Shearing apparatus for removing the head of a key from the shank thereof comprising in combination, a relatively stationary die shaped in accordance with the cut to be made between the head and shank of the key, a movable die shaped complementally of said stationary die to cooperate therewith to shearingly remove said key head, alignment means on said stationary die to abuttingly receive the travel limiting means on the key to properly align said key relative to said stationary and movable dies, and retaining means on said stationary die for releasably holding said key in said aligned position on said stationary die whereby a plurality of keys can be identically shaped.

2. Shearing apparatus for removing the head of a key from the shank thereof according to claim 1, wherein said movable die further comprises a punch for providing a hole in the shank of the key during removal of the head thereof.

3. Shearing apparatus for removing the head of a key from the shank thereof according to claim 2, wherein said stationary die is further formed with a depression for receiving the shank of the key for cooperation with said alignment means to properly orient said key relative to said die and punch.

4. Shearing apparatus for removing the head of a key from the shank thereof according to claim 3, wherein said retaining means comprises a retaining element movably mounted on said stationary die and having an end portion engageable with the shank of the key within said depression, means interposed between said element and said stationary die to urge said element to retracted position out of engagement with said ey, and operating means for moving said element from its retracted position into retaining position with said key.

5. Shearing apparatus for removing the head of a key from the shank thereof according to claim 4, wherein said operating means comprises locking means for firmly retaining said key in aligned position relative to said dies.

6. Shearing apparatus for removing the head of a key from the shank thereof according to claim 5, wherein said locking means comprises a quick-release operating lever having a cam portion engagable with said retaining element to urge said element into retaining position in response to predetermined minimal movement of said operating lever.

7. Shearing apparatus for removing the head of a key from the shank thereof according to claim 6, wherein said movable die and said punch are firmly connected for simultaneous movement to simultaneously remove the head of said key and provide a hole in the shank thereof.

8. Shearing apparatus for removing the head of a key from the shank thereof according to claim 7, wherein said alignment means comprises an abutment adjacent the said depression in said stationary die to abuttingly receive the travel limiting means on the key to properly position said key in one pair of opposite directions relative to said dies, the depression in said stationary die effecting proper alignment of said key in another pair of opposite directions.

9. Shearing apparatus for removing the head of a key from the shank thereof according to claim 8, wherein both said stationary and movable dies are shaped in accordance with the desired configuration of the end of the shank to be provided to insure shearing operation therebetween.

References Cited

UNITED STATES PATENTS

| | | | |
|---|---|---|---|
| 13,920 | 12/1855 | Rice et al. | 83—459 |
| 1,044,861 | 11/1912 | Cox | 83—459 |
| 1,884,398 | 10/1932 | Uxley | 83—633 X |
| 3,274,869 | 9/1966 | Piazze | 83—620 X |

WILLIAM S. LAWSON, *Primary Examiner.*

U.S. Cl. X.R.

83—463, 467, 620, 633, 682, 925